United States Patent [19]

Harasawa et al.

[11] Patent Number: 5,615,290
[45] Date of Patent: Mar. 25, 1997

[54] BRANCH DEVICE FOR OPTICAL MULTIPLEX SYSTEM

[75] Inventors: Shinichirou Harasawa; Haruo Fujiwara, both of Kawasaki, Japan

[73] Assignee: Fujitsu Limited, Kanagawa, Japan

[21] Appl. No.: 641,563

[22] Filed: May 1, 1996

[30] Foreign Application Priority Data

Oct. 16, 1995 [JP] Japan .................... 7-266744

[51] Int. Cl.$^6$ .................... G02B 6/28; H04J 14/00
[52] U.S. Cl. .................... 385/24; 385/27; 385/31; 385/39; 385/42; 385/44; 385/46; 359/115; 359/119; 359/124; 359/127
[58] Field of Search .................... 385/24, 27, 31, 385/32, 39, 42, 46, 48, 50, 123, 100, 44; 359/115, 119, 121, 124, 125, 127, 178, 179

[56] References Cited

U.S. PATENT DOCUMENTS

| | | | |
|---|---|---|---|
| 3,883,217 | 5/1975 | Love et al. | 385/24 X |
| 3,883,222 | 5/1975 | Gunderson | 385/24 X |
| 4,072,399 | 2/1978 | Love | 385/24 X |
| 4,246,475 | 1/1981 | Altman | 385/24 X |
| 4,252,402 | 2/1981 | Puech et al. | 385/24 X |
| 4,580,872 | 4/1986 | Bhatt et al. | 385/24 |
| 4,702,550 | 10/1987 | Sano | 385/24 X |
| 4,740,050 | 4/1988 | Husain | 385/24 X |
| 4,747,651 | 5/1988 | Wiesmeier | 385/24 X |
| 4,810,052 | 3/1989 | Fling | 385/24 X |
| 4,832,434 | 5/1989 | Sauer et al. | 385/24 X |
| 4,859,019 | 8/1989 | Bevan | 385/24 X |
| 4,909,585 | 3/1990 | Kobayashi et al. | 385/24 X |
| 5,005,937 | 4/1991 | Aida et al. | 385/24 X |
| 5,155,779 | 10/1992 | Avramopoulos et al. | 385/24 |
| 5,282,257 | 1/1994 | Ota | 385/24 X |
| 5,315,674 | 5/1994 | Asako | 385/24 X |
| 5,414,548 | 5/1995 | Tachikawa et al. | 385/24 X |
| 5,434,937 | 7/1995 | Glance | 385/24 |
| 5,533,154 | 7/1996 | Smith | 385/24 X |

FOREIGN PATENT DOCUMENTS

| | | | |
|---|---|---|---|
| 0579134A1 | 1/1994 | European Pat. Off. | 385/24 X |
| 56-111819 | 9/1981 | Japan | 385/24 X |
| 5-127043 | 5/1993 | Japan | 385/24 X |
| 6-27345 | 2/1994 | Japan | 385/24 X |
| 6-201942 | 7/1994 | Japan | 385/24 X |

*Primary Examiner*—Brian Healy

[57] ABSTRACT

A branch device for use in an optical multiplex system allows three stations to be interconnected by a relatively small number of optical fibers. The branch device has WDM couplers each having a port A connected to a port C through a through path and to a port D through a cross path, and a port B connected to the port C through a cross path and to the port D through a through path. A signal light having a wavelength $\lambda_{AB}$ in a through-path wavelength band, inputted from a cable end A, is transmitted through a through path in one of the WDM couplers to a cable end B. A signal light having a wavelength $\lambda_{AC}$ in a cross-path wavelength band, inputted from the cable end A, is transmitted through a cross path in the WDM coupler to the B port thereof, and then transmitted through a cross path in another WDM coupler to a cable end C. Similarly, signal lights inputted from the other cable ends B, C are divided and transmitted through paths depending on their wavelengths. Stations can be connected to the branch device by transmission cables each comprising a single pair of optical fibers for bidirectional transmission of signal lights between the stations through the branch device. A repeater on each of the transmission cables may be of a single-system configuration for upstream and downstream transmission.

5 Claims, 10 Drawing Sheets

5,615,290

BRANCH DEVICE FOR OPTICAL MULTIPLEX SYSTEM

BACKGROUND OF THE INVENTION (1) Field of the Invention

The present invention relates to a branch device for use in an optical multiplex system in an optical communication network, and more particularly to a branch device for use in an optical multiplex system for making more economical an optical communication network which incorporates such a branch device.

(2) Description of the Related Art

In an optical communication network, light outputted from one station can be branched by a branch device and transmitted to a plurality of stations. If such a branch device is incorporated in a submarine optical transmission system, then it is possible to branch signal light undersea and transmit it to a plurality of stations on land.

FIG. 10 of the accompanying drawings shows a conventional undersea branch device (Bu) 50. To the undersea branch device 50, there are connected cable ends A, B, and C of respective three transmission cables connected respectively to three stations. Specifically, upstream and downstream optical fibers (fiber pairs) are connected between the stations such that two optical fibers 51, 52 extend between the cable ends A and B, two optical fibers 53, 54 extend between the cable ends C and B, and two optical fibers 55, 56 extend between the cable ends B and A, all through the branch device 50. For transmitting signal light, each of the stations selects one of the connected optical fibers connected thereto depending on the direction in which the signal light is to be transmitted therefrom. Signal light transmitted between the three stations connected to the transmission cables can be branched by the branch device 50.

The conventional undersea branch device 50 requires many fiber cables to be installed because each combination of two stations needs a fiber pair of upstream and downstream optical fibers. Since one station is connected to two stations through respective fiber pairs, a repeater on each transmission cable needs to be of a dual-system configuration for amplifying signal light transmitted through such two fiber pairs. It is not possible to employ an inexpensive single-system repeater for amplifying signal light transmitted through a single fiber pair.

SUMMARY OF THE INVENTION

It is therefore an object of the present invention to provide a branch device for use in an optical multiplex system, which requires a reduced number of optical fibers for connection between three stations in the optical multiplex system.

To accomplish the above object, there is provided in accordance with the present invention a branch device for use in an optical multiplex system, connected to first, second, and third transmission paths extending to respective stations in an optical communication network, for branching signal lights transmitted between the stations, comprising first wavelength dividing and multiplexing means for outputting a signal light in a first band inputted to a first input port thereof to a first output port thereof, outputting a signal light in a second band inputted to the first input port thereof to a second output port thereof, and outputting a signal light in the second band inputted to a second input port thereof to the first output port thereof, the first input port being connected to an input optical fiber connected to the first transmission path, the first output port being connected to an output optical fiber connected to the second transmission path, second wavelength dividing and multiplexing means for outputting a signal light in the first band inputted to a first input port thereof to a first output port thereof, outputting a signal light in the second band inputted to the first input port thereof to a second output port thereof, and outputting a signal light in the second band inputted to a second input port thereof to the first output port thereof, the first input port of the second wavelength dividing and multiplexing means being connected to an input optical fiber connected to the second transmission path, the second input port of the second wavelength dividing and multiplexing means being connected to the second output port of the first wavelength dividing and multiplexing means, the first output port of the second wavelength dividing and multiplexing means being connected to an output optical fiber connected to the third transmission path, and third wavelength dividing and multiplexing means for outputting a signal light in the first band inputted to a first input port thereof to a first output port thereof, outputting a signal light in the second band inputted to the first input port thereof to a second output port thereof, and outputting a signal light in the second band inputted to a second input port thereof to the first output port thereof, the first input port of the third wavelength dividing and multiplexing means being connected to an input optical fiber connected to the third transmission path, the second input port of the third wavelength dividing and multiplexing means being connected to the second output port of the second wavelength dividing and multiplexing means, the first output port of the third wavelength dividing and multiplexing means being connected to an output optical fiber connected to the first transmission path, the second output port of the third wavelength dividing and multiplexing means being connected to the second input port of the first wavelength dividing and multiplexing means.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
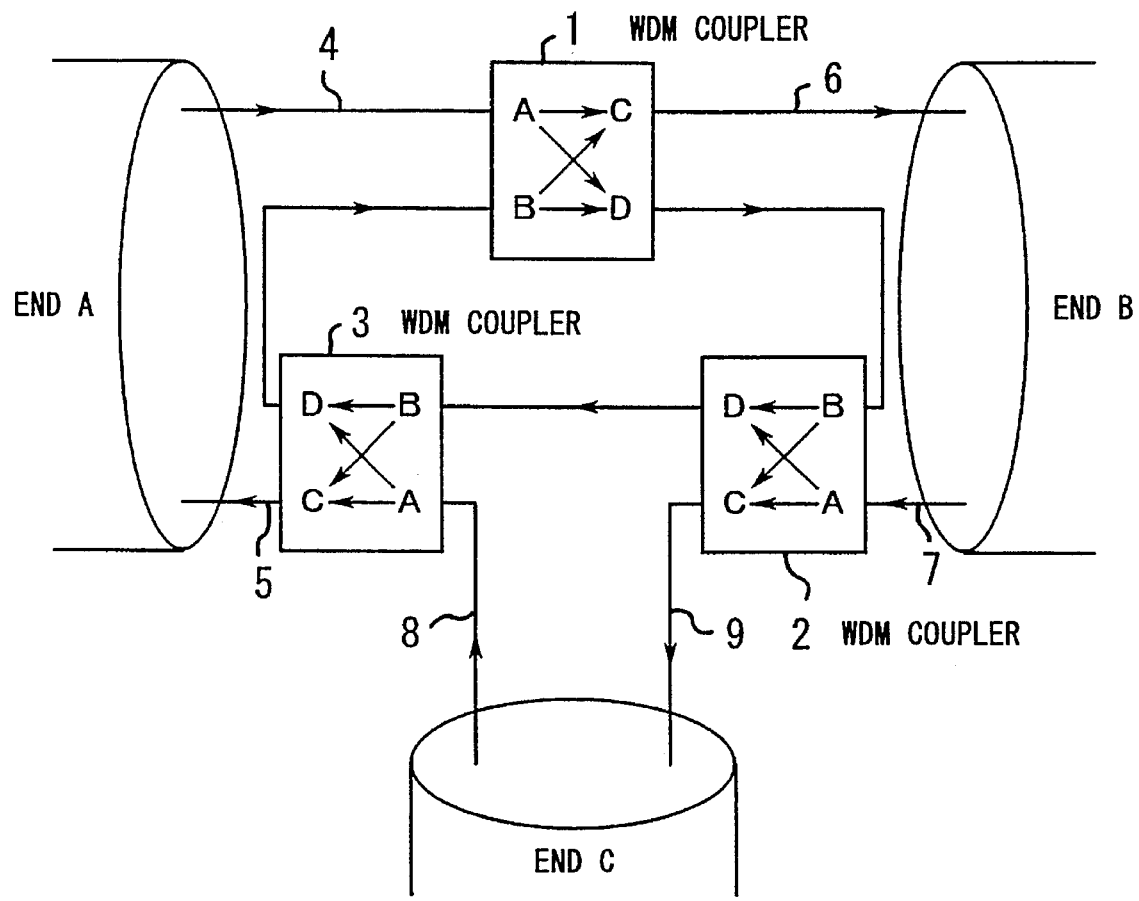
FIG. 1 is a block diagram illustrative of the principles of a branch device (Bu) for use in an optical multiplex system according to the present invention.

FIG. 1 illustrates the principles of a branch device (Bu) for use in an optical multiplex system according to the present invention. As shown in FIG. 1, the branch device has three junctions for connection to three stations, respectively, through respective optical transmission cables having respective cable ends A, B, C. Specifically, the branch device has a WDM (Wavelength Division Multiplex) coupler 1 inserted in an optical passage from the cable end A to the cable end B, a WDM coupler 2 inserted in an optical passage from the cable end B to the cable end C, and a WDM coupler 3 inserted in an optical passage from the cable end C to the cable end A. The WDM couplers 1, 2, 3 are capable of selecting either one of through and cross paths therein depending on the wavelength of signal light which is to pass therethrough. Each of the WDM couplers 1, 2, 3 has two input ports A, B and two output ports C, D.

An input optical fiber 4 extending from the cable end A is connected to the port A of the WDM coupler 1. The port B of the WDM coupler 1 is connected to the port D of the WDM coupler 3. The port C of the WDM coupler 1 is connected to an output optical fiber 6 connected to the cable end B. The port D of the WDM coupler 1 is connected to the port B of the WDM coupler 2. An input optical fiber 7 extending from the cable end B is connected to the port A of the WDM coupler 2. The port C of the WDM coupler 2 is connected to an output optical fiber 9 connected to the cable end C. The port D of the WDM coupler 2 is connected to the port B of the WDM coupler 3. The port A of the WDM coupler 3 is connected to an input optical fiber 8 extending from the cable end C. The port C of the WDM coupler 3 is connected to an output optical fiber 5 connected to the cable end A.

Figure 2:
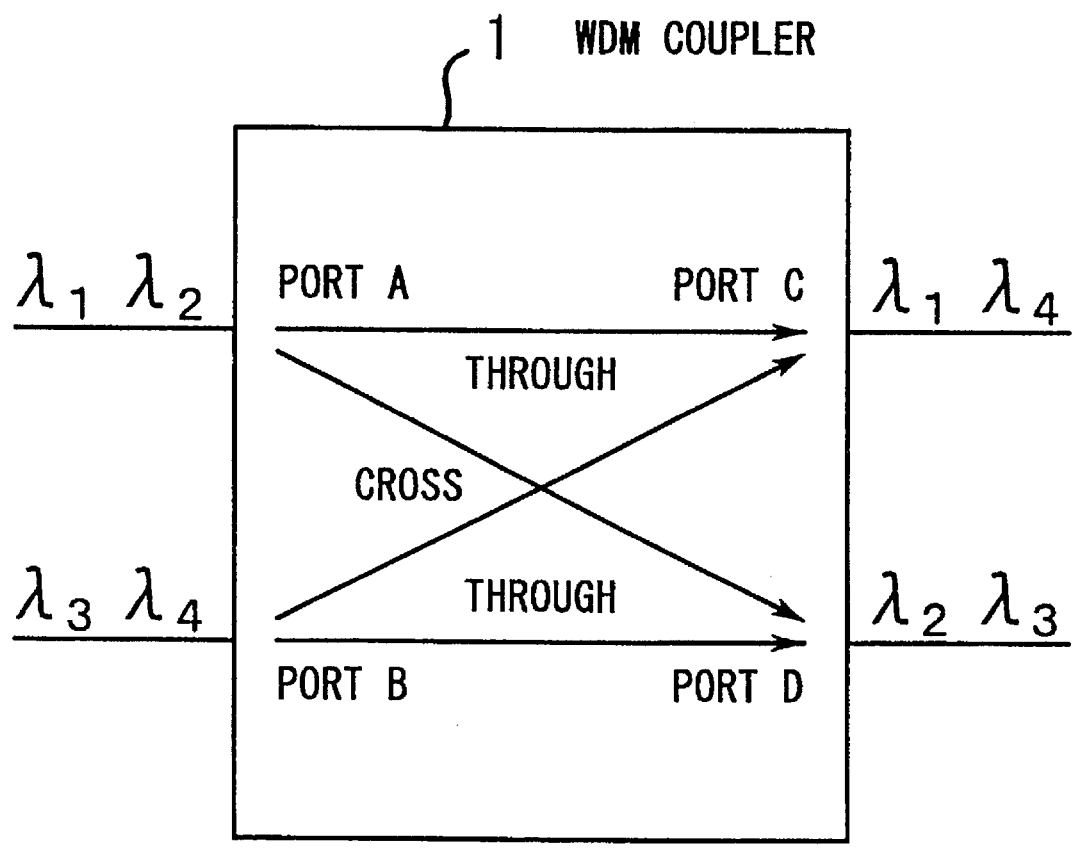
FIG. 2 is a block diagram showing a pattern of connections between ports of a WDM (Wavelength Division Multiplex) coupler of the branch device.

FIG. 2 shows a pattern of connections between the ports of the WDM coupler 1. The port A is connected to the port C by a through path and to the port D by a cross path. The port B is connected to the port D by a through path and to the port C by a cross path. The ports of the other WDM couplers 2, 3 are connected in the same pattern as with the WDM coupler 1.

Signal lights having respective different wavelengths $\lambda_1$, $\lambda_2$, $\lambda_3$, $\lambda_4$ are applied to and transmitted through the WDM couplers 1, 2, 3. The wavelengths $\lambda_1$, $\lambda_3$ belong to such a wavelength band (also referred to as a through-path wavelength band) that they are transmitted through the through paths, and the wavelengths $\lambda_2$, $\lambda_4$ belong to such a wavelength band (also referred to as a cross-path wavelength band) that they are transmitted through the cross paths. Therefore, when the signal lights having the wavelengths $\lambda_1$, $\lambda_2$ are applied to the port A, the signal light having the wavelength $\lambda_1$ is outputted to the port C, and the signal light having the wavelength $\lambda_2$ is outputted to the port D. When the signal lights having the wavelengths $\lambda_3$, $\lambda_4$ are applied to the port B, the signal light having the wavelength $\lambda_3$ is outputted to the port D, and the signal light having the wavelength $\lambda_4$ is outputted to the port C.

Figure 3:
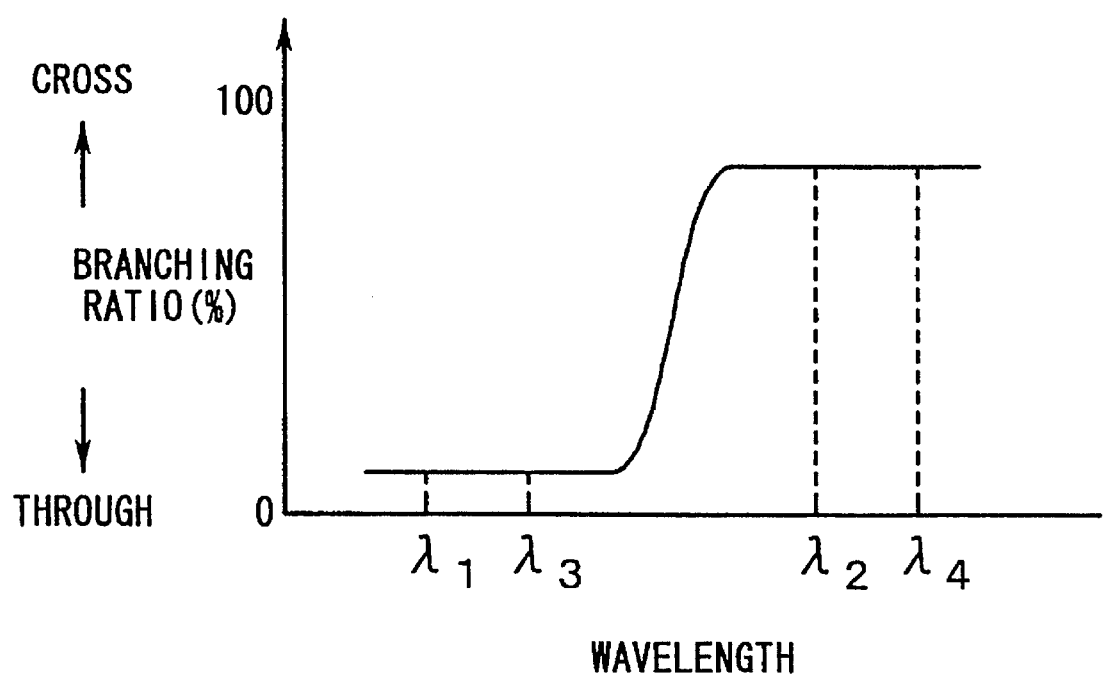
FIG. 3 is a diagram showing wavelengths of signal lights transmitted through the WDM coupler.

FIG. 3 shows the wavelengths of signal lights transmitted through a WDM coupler which comprises a dielectric multilayer WDM coupler. The graph shown in FIG. 3 has a horizontal axis representing the wavelengths of signal lights, and a vertical axis representing a branching ratio. The branching ratio indicates a through path in the WDM coupler when it is of a smaller value, and indicates a cross path in the WDM coupler when it is of a larger value. The signal lights having the wavelengths $\lambda_1$, $\lambda_3$ described above with reference to FIG. 2 belong to a through-path wavelength band, and the signal lights having the wavelengths $\lambda_2$, $\lambda_4$ described above with reference to FIG. 2 belong to a cross-path wavelength band.

The WDM couplers 1, 2, 3 are arranged to transmit signal lights whose wavelengths are in a wavelength band ranging from 1.53 μm unto 1.56 μm. Those signal lights whose wavelengths are in the vicinity of 1.53 μm are transmitted through the through paths, and those signal lights whose wavelengths are in the vicinity of 1.56 μm are transmitted through the cross paths.

WDM couplers include fiber-fused WDM couplers as well as dielectric multilayer WDM couplers. The fiber-fused WDM couplers have a sinusoidal wavelength vs. branching ratio characteristic curve such that signal lights whose wavelengths are at the valley of the sinusoidal curve are transmitted through the through paths and signal lights whose wavelengths are at the peak of the sinusoidal curve are transmitted through the cross paths.

Figure 4:
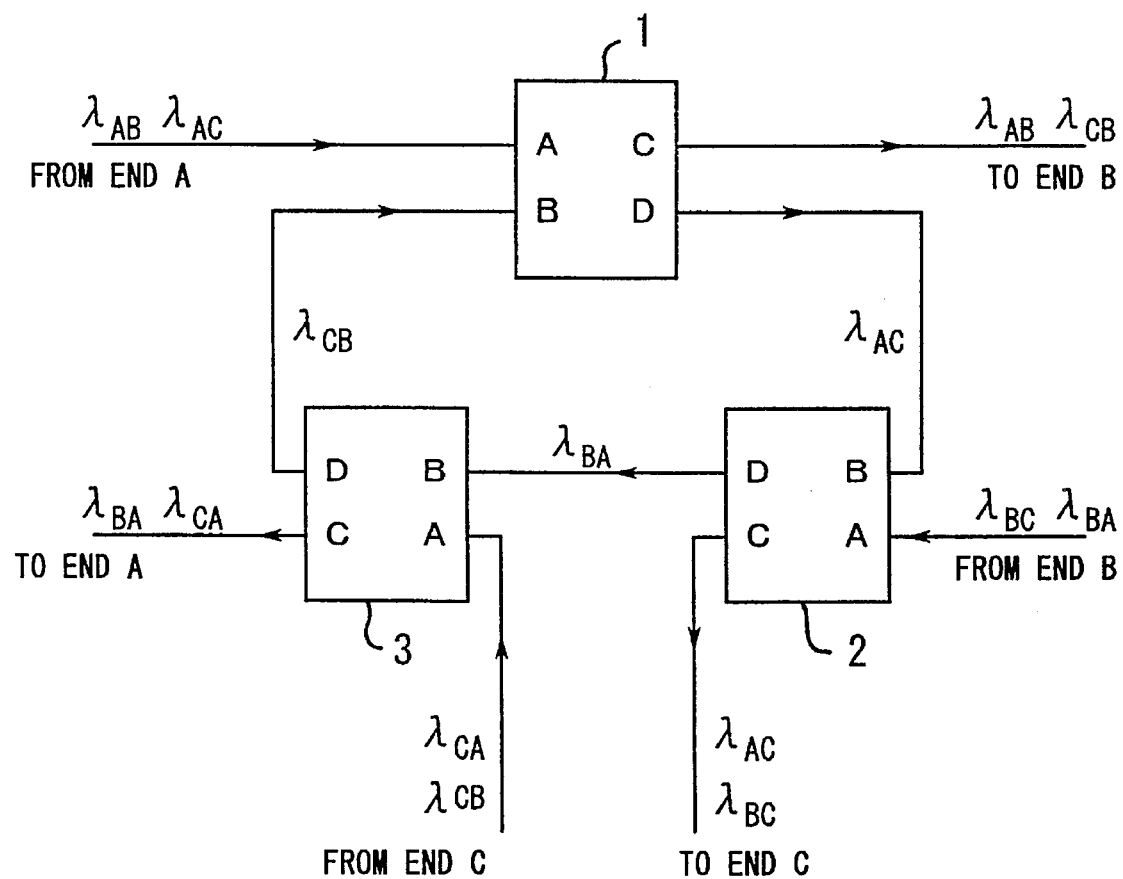
FIG. 4 is a block diagram showing the manner in which signal lights are transmitted from input ends to output ends through the branch device.

An optical transmission process effected by the branch device of the above structure will be described below. FIG. 4 shows the manner in which signal lights are transmitted from the input ends to the output ends through the branch device. It is assumed that a signal light to be transmitted from the cable end A to the cable end B has a wavelength $\lambda_{AB}$, a signal light to be transmitted from the cable end A to the cable end C has a wavelength $\lambda_{AC}$, a signal light to be transmitted from the cable end B to the cable end C has a wavelength $\lambda_{BC}$, a signal light to be transmitted from the cable end B to the cable end A has a wavelength $\lambda_{BA}$, a signal light to be transmitted from the cable end C to the cable end A has a wavelength $\lambda_{CA}$, and a signal light to be transmitted from the cable end C to the cable end B has a wavelength $\lambda_{CB}$. The signal lights having the wavelengths $\lambda_{AB}$, $\lambda_{BC}$, $\lambda_{CA}$ belong to the through-path wavelength band, and the signal lights having the wavelengths $\lambda_{AC}$, $\lambda_{BA}$, $\lambda_{CB}$ belong to the cross-path wavelength band.

The signal light having the wavelength $\lambda_{AB}$ which is inputted from the cable end A and belongs to the through-path wavelength band is transmitted through a through path in the WDM coupler 1 to the cable end B. The signal light having the wavelength $\lambda_{AC}$ which is inputted from the cable end A and belongs to the cross-path wavelength band is transmitted through a cross path in the WDM coupler 1 to the port B of the WDM coupler 2, and then transmitted through a cross path in the WDM coupler 2 to the cable end C.

The signal light having the wavelength $\lambda_{BC}$ which is inputted from the cable end B and belongs to the through-path wavelength band is transmitted through a through path in the WDM coupler 2 to the cable end C. The signal light having the wavelength $\lambda_{BA}$ which is inputted from the cable end B and belongs to the cross-path wavelength band is transmitted through a cross path in the WDM coupler 2 to the port B of the WDM coupler 3, and then transmitted through a cross path in the WDM coupler 3 to the cable end A.

The signal light having the wavelength $\lambda_{CA}$ which is inputted from the cable end C and belongs to the through-path wavelength band is transmitted through a through path in the WDM coupler 3 to the cable end A. The signal light having the wavelength $\lambda_{CB}$ which is inputted from the cable end C and belongs to the cross-path wavelength band is transmitted through a cross path in the WDM coupler 3 to the port B of the WDM coupler 1, and then transmitted through a cross path in the WDM coupler 1 to the cable end B.

With this arrangement, it is possible to connect each station to the branch device with a single pair of optical fibers for transmitting signal lights between the stations. Accordingly, a repeater on each transmission cable may be of a single-system configuration for upstream and downstream optical transmission. An optical communication network which interconnects a number of stations in many countries for transoceanic submarine optical transmission needs very long transmission cables between the stations which require many repeaters. If the branch device according to the present invention is incorporated in such an optical communication network, then the transmission cable connected to each of the stations may comprise a single pair of optical fibers, and a repeater on each of the transmission cable may be of a single-system configuration for bidirectional optical communications. Therefore, the branch device according to the present invention is highly effective to make the optical communication network economical.

Various undersea branch devices based on the principles of the present invention for use in optical communication networks for submarine optical transmission will be described below.

Figure 5:
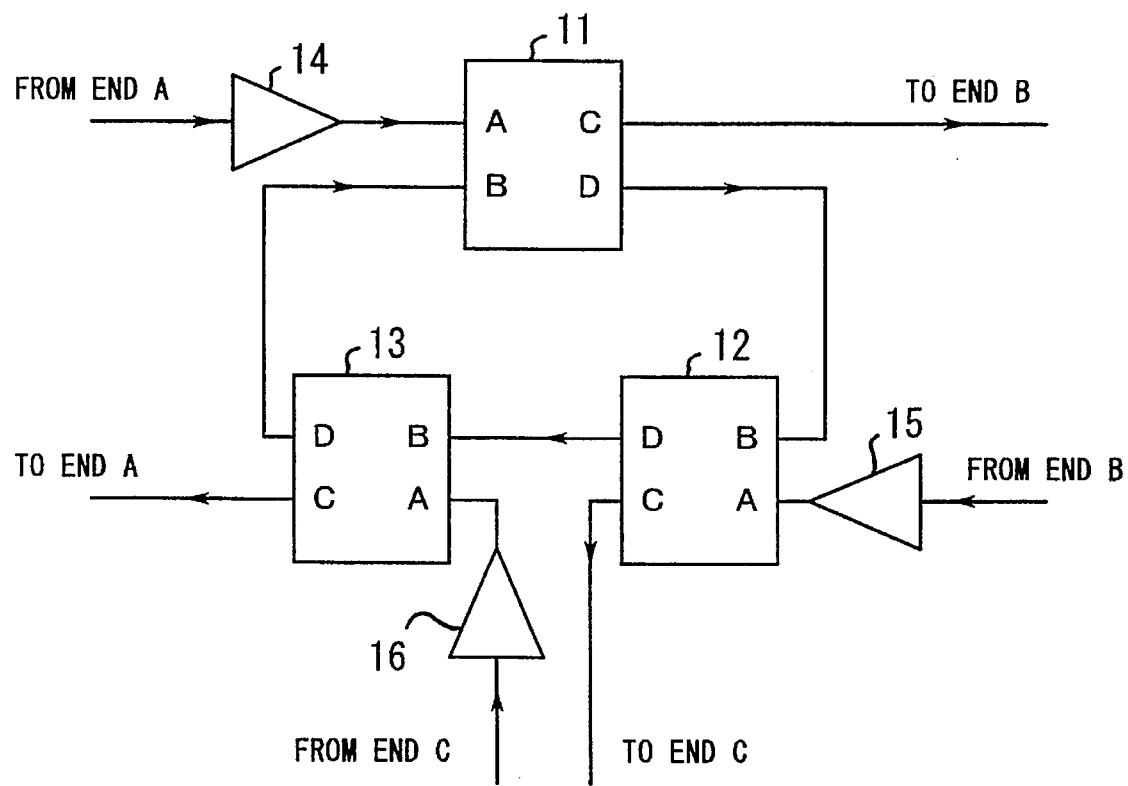
FIG. 5 is a block diagram of an undersea branch device which comprises WDM couplers and light amplifiers.

FIG. 5 shows in block form an undersea branch device which comprises WDM couplers and light amplifiers. The undersea branch device shown in FIG. 5 has three WDM couplers 11, 12, 13, which are identical to the WDM couplers 1, 2, 3 shown in FIG. 1. The undersea branch device also includes a light amplifier 14 connected between an input optical fiber from the cable end A and the port A of the WDM coupler 11, a light amplifier 15 connected between an input optical fiber from the cable end B and the port A of the WDM coupler 12, and a light amplifier 16 connected between an input optical fiber from the cable end C and the port A of the WDM coupler 13.

The light amplifiers 14, 15, 16 connected to the input optical fibers serve to amplify signal lights transmitted from the transmission cables within the undersea branch device. Therefore, the undersea branch device with such a signal light amplifying capability can reduce the number of repeaters which are generally required in a submarine optical transmission system. While the light amplifiers 14, 15, 16 are connected to the input optical fibers, they may be connected to output optical fibers which are connected to the cable ends A, B, C.

Figure 6:
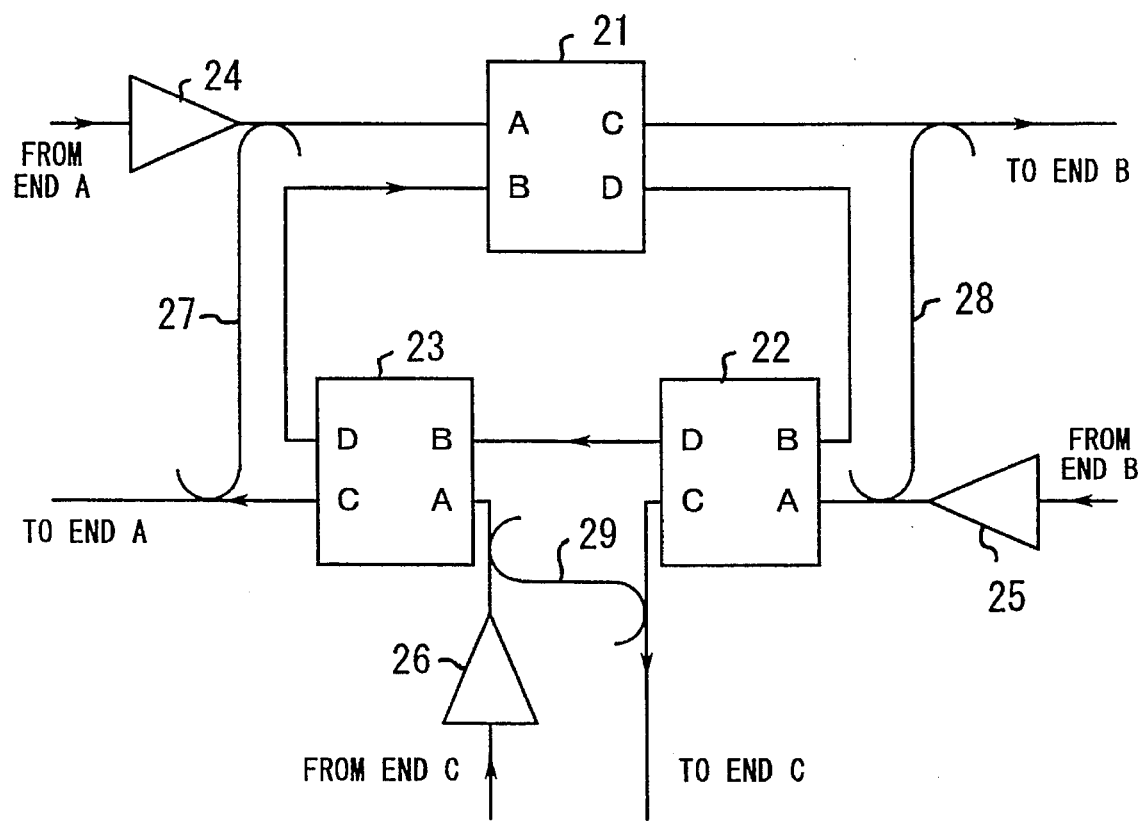
FIG. 6 is a block diagram of an undersea branch device which comprises WDM couplers, light amplifiers, and OTDR (Optical Time-Domain Reflectometer) paths.

FIG. 6 shows in block form an undersea branch device which comprises WDM couplers, light amplifiers, and OTDR (Optical Time-Domain Reflectometer) paths. The undersea branch device shown in FIG. 6 has WDM couplers 21, 22, 23 and light amplifiers 24, 25, 26, which are identical to those of the undersea branch device shown in FIG. 5, and additionally includes OTDR paths. The light amplifiers 24, 25, 26 have built-in optical isolators for transmitting light in a forward direction, but preventing light from being transmitted in a reverse direction.

The optical time-domain reflectometer is a testing device which transmits an optical pulse into an optical fiber from an end thereof, observes a reflected pulse in the time domain, and measures the distance to a reflecting spot and the reflectance based on the time required for the optical pulse to travel to the reflecting spot and the magnitude of the reflected pulse. The optical time-domain reflectometer is mainly used to identify the nature and location of a defect in the optical fiber. An OTDR path serves to transfer a pulsed signal light reflected from such a defect to a transmitting optical fiber to a receiving optical fiber, and comprises a general coupler.

The OTDR paths of the undersea branch device shown in FIG. 6 include an OTDR path coupler 27 connected between the port A of the WDM coupler 21 at the output side of the light amplifier 24 and an output optical fiber connected to the cable end A, an OTDR path coupler 28 connected between the port A of the WDM coupler 22 at the output side of the light amplifier 25 and an output optical fiber connected to the cable end B, and an OTDR path coupler 29 connected between the port A of the WDM coupler 23 at the output side of the light amplifier 26 and an output optical fiber connected to the cable end C.

A signal light inputted from the cable end A to the WDM coupler 21 is branched by the undersea branch device and transmitted through a transmission cable connected to another station. When the signal light encounters a defect in the transmission cable, it is reflected by the defect and travels back to the WDM coupler 21. The reflected signal light is transmitted from the port A of the WDM coupler 21 through the OTDR path coupler 27 to the output optical fiber connected to the cable end A. Signal lights inputted from the cable ends B, C are also reflected by defects in transmission cables and transmitted back to the respective output optical fibers connected to the cable ends B, C.

Therefore, even when the transmission cables branched from the undersea branch device suffer a defect, the OTDR path couplers 27, 28, 29 connected at the output sides of the light amplifiers 24, 25, 26, respectively, allow the station which transmits the signal light to identify such a defect.

Figure 7:
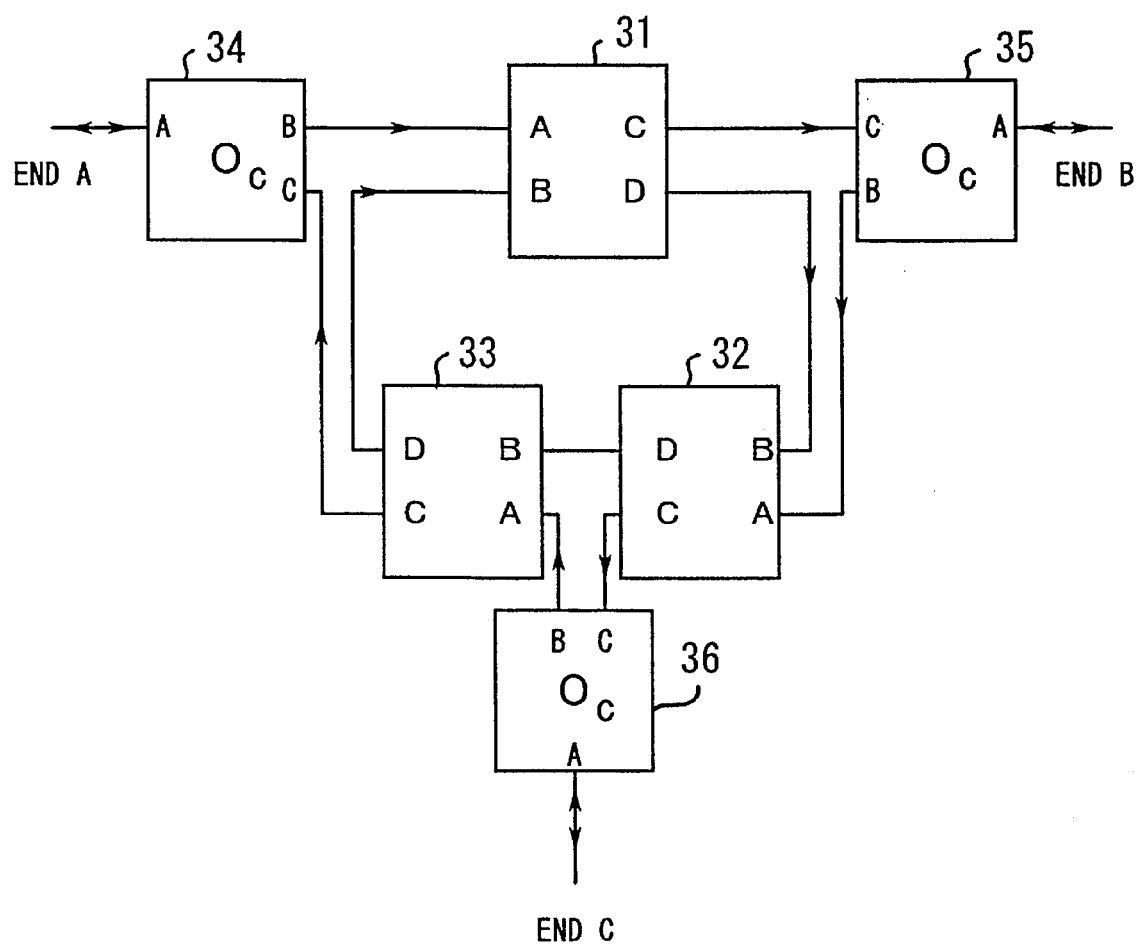
FIG. 7 is a block diagram of an undersea branch device which comprises WDM couplers and optical circulators for allowing stations to be connected by single-fiber transmission cables.

FIG. 7 shows in block form an undersea branch device which comprises WDM couplers and optical circulators for allowing stations to be connected by single-fiber transmission cables. The undersea branch device shown in FIG. 7 has three WDM couplers 31, 32, 33, which are identical to the WDM couplers 1, 2, 3 shown in FIG. 1. The undersea branch device also includes three optical circulators (Oc) 34, 35, 36 which allow stations to be connected by single-fiber transmission cables. The optical circulators 34, 35, 36 are capable of transmitting light supplied from a port to only one port adjacent thereto. In the illustrated embodiment, each of the optical circulators 34, 35, 36 has three ports A, B, C, and transmits light from the port A to the port B, transmits light from the port B to the port C, and transmits light from the port C to the port A.

In FIG. 7, a single optical fiber for upstream and downstream optical transmission which extends from the cable end A is connected to the port A of the optical circulator 34. The port B of the optical circulator 34 is connected to the port A of the WDM coupler 31, and the port C of the optical circulator 34 is connected to the port C of the WDM coupler 33. Similarly, a single optical fiber for upstream and downstream optical transmission which extends from the cable end B is connected to the port A of the optical circulator 35. The port B of the optical circulator 35 is connected to the port A of the WDM coupler 32, and the port C of the optical circulator 35 is connected to the port C of the WDM coupler 31. A single optical fiber for upstream and downstream optical transmission which extends from the cable end C is connected to the port A of the optical circulator 36. The port B of the optical circulator 36 is connected to the port A of the WDM coupler 33, and the port C of the optical circulator 36 is connected to the port C of the WDM coupler 32.

A signal light inputted from the cable end A is introduced into the optical circulator 34 from the port A thereof and outputted to the port B thereof. The signal light is then applied to the port A of the WDM coupler 31. If the signal light belongs to the through-path wavelength band, then it is transmitted to the port C of the optical circulator 35. If the signal light belongs to the cross-path wavelength band, then it is transmitted to the port C of the optical circulator 36. The signal lights supplied to the ports C of the optical circulators 35, 36 are outputted to the respective ports A thereof. As a result, the signal light which belongs to the through-path wavelength band is outputted from the undersea branch device to the cable end B, and the signal light which belongs to the cross-path wavelength band is outputted from the undersea branch device to the cable end C. Signal lines inputted from the cable ends B, C are similarly transmitted.

The optical circulators 34, 35, 36 thus allow single-fiber transmission cables to be used to connect stations. Accordingly, the undersea branch device shown in FIG. 7 is more effective to make economical an optical communication network which incorporates the undersea branch device.

Figure 8:
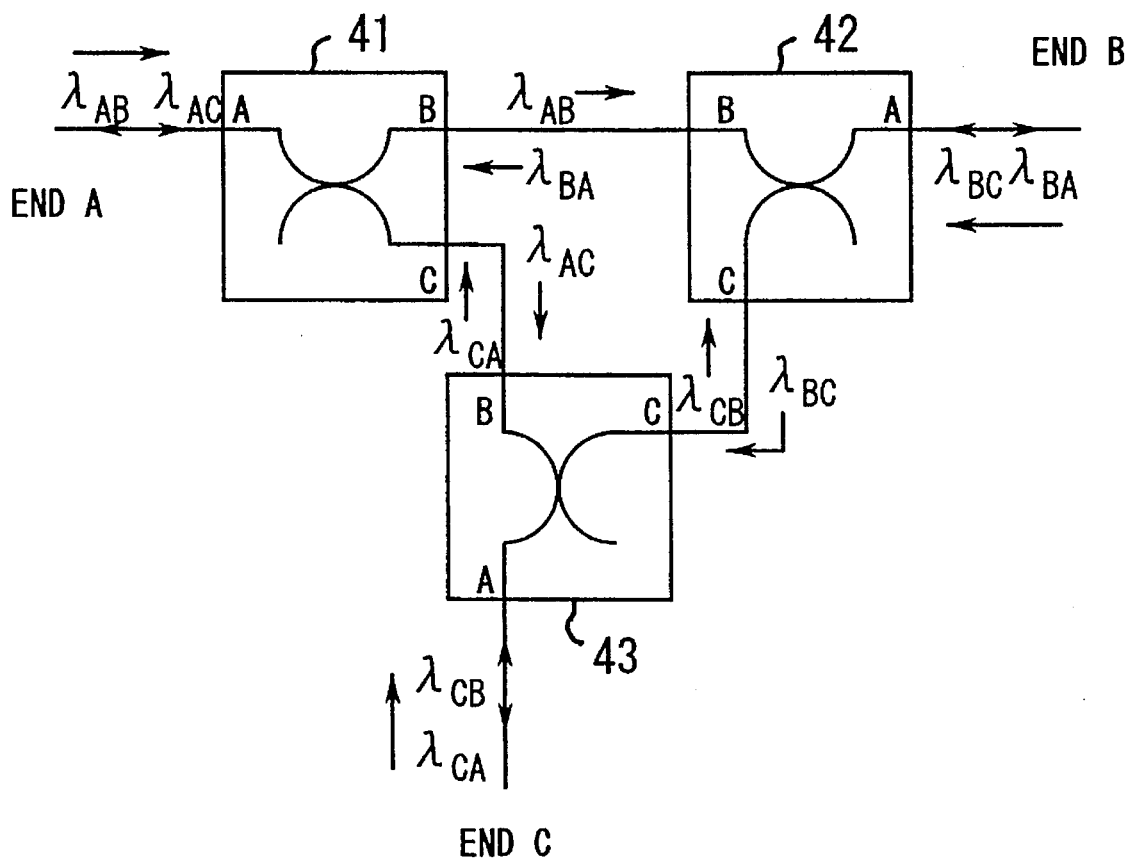
FIG. 8 is a block diagram of an undersea branch device which comprises WDM couplers of different characteristics.

FIG. 8 shows in block form an undersea branch device which comprises WDM couplers of different characteristics. The WDM couplers of the undersea branch device shown in FIG. 8 have different characteristics as described later on. The transmission cable connected to each station comprises a single optical fiber.

As shown in FIG. 8, an optical fiber from the cable end A is connected to a port A of a WDM coupler 41, an optical fiber from the cable end B to a port A of a WDM coupler 42, and an optical fiber from the cable end C to a port A of a WDM coupler 43. A port B of the WDM coupler 41 is connected to a port B of the WDM coupler 42, a port C of the WDM coupler 41 to a port B of the WDM coupler 43, and a port C of the WDM coupler 42 to a port C of the WDM coupler 43.

Figure 9:
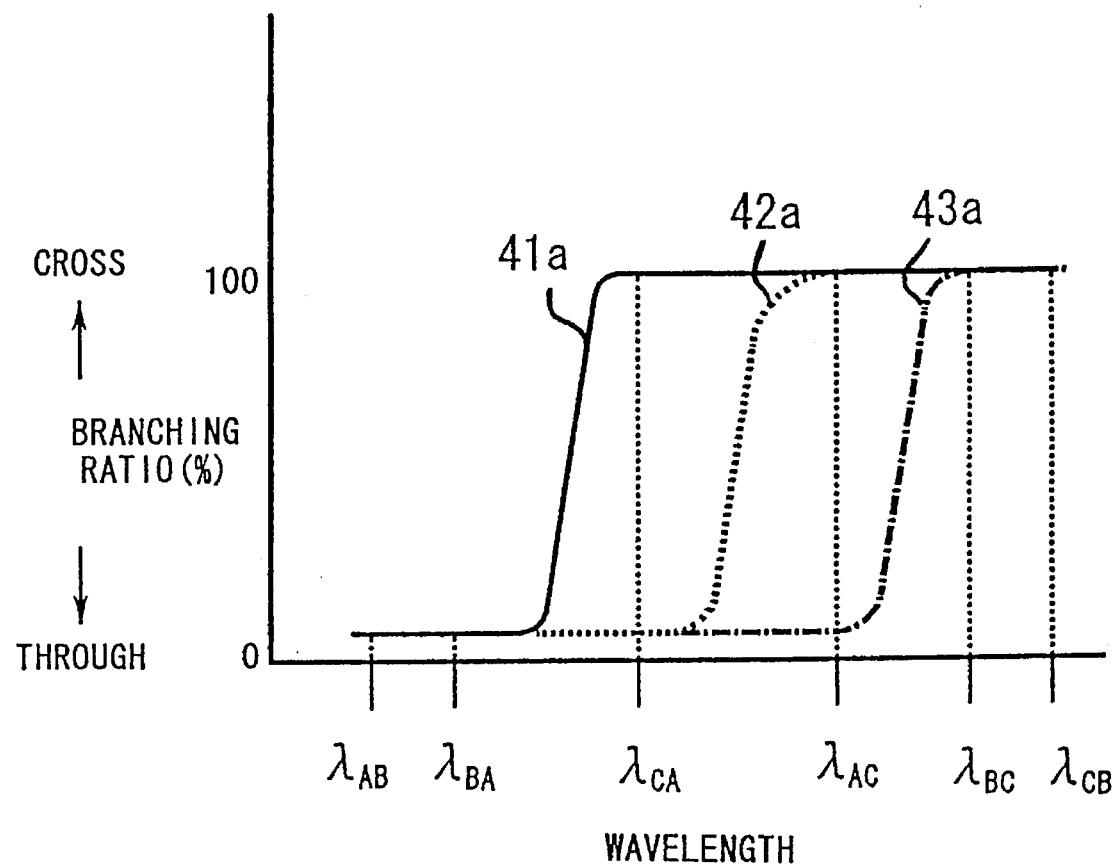
FIG. 9 is a diagram showing the characteristics of the WDM couplers shown in FIG. 8.
Figure 10:
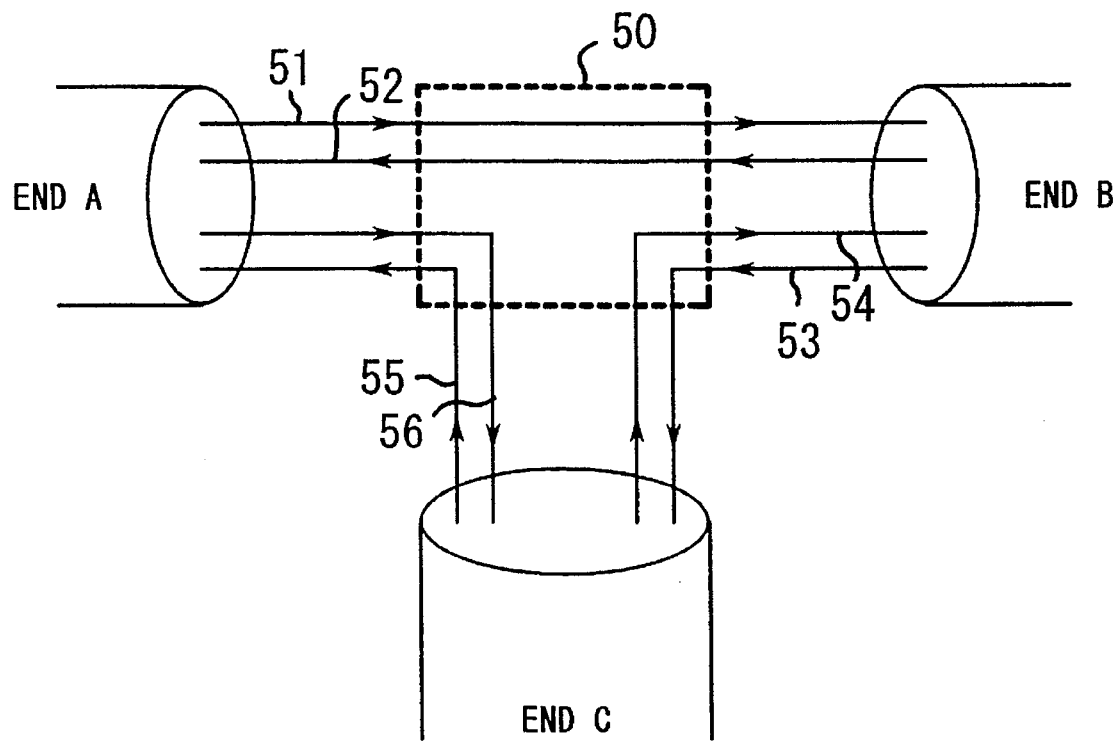
FIG. 10 is a block diagram of a conventional undersea branch device.

FIG. 9 shows the characteristics of the WDM couplers 41, 42, 43 shown in FIG. 8. The graph shown in FIG. 9 has horizontal axis representing the wavelengths of signal lights, and a vertical axis representing a branching ratio. The branching ratio indicates a through path in the WDM coupler when it is of a smaller value, and indicates a cross path in the WDM coupler when it is of a larger value.

It is assumed that a signal light to be transmitted from the cable end A to the cable end B has a wavelength $\lambda_{AB}$, a signal light to be transmitted from the cable end A to the cable end C has a wavelength $\lambda_{AC}$, a signal light to be transmitted from the cable end B to the cable end C has a wavelength $\lambda_{BC}$, a signal light to be transmitted from the cable end B to the cable end A has a wavelength $\lambda_{BA}$, a signal light to be transmitted from the cable end C to the cable end A has a wavelength $\lambda_{CA}$, and a signal light to be transmitted from the cable end C to the cable end B has a wavelength $\lambda_{CB}$. These wavelengths satisfy the relationship: $\lambda_{AB} < \lambda_{BA} < \lambda_{CA} < \lambda_{AC} < \lambda_{BC} < \lambda_{CB}$.

In FIG. 9, the WDM coupler 41 has a wavelength vs. branching ratio characteristic curve indicated by the solid line 41a, the WDM coupler 42 has a wavelength vs. branching ratio characteristic curve indicated by the dotted line 42a, and the WDM coupler 43 has a wavelength vs. branching ratio characteristic curve indicated by the dot-and-dash line 43a. Therefore, the WDM coupler 41 allows the signal lights having the wavelengths $\lambda_{AB}$, $\lambda_{BA}$ to be transmitted through the through path therein, and allows the signal lights having the wavelengths $\lambda_{CA}$, $\lambda_{AC}$, $\lambda_{BC}$, $\lambda_{CB}$ to be transmitted through the cross path therein. The WDM coupler 42 allows the signal lights having the wavelengths $\lambda_{AB}$, $\lambda_{BA}$, $\lambda_{CA}$ to be transmitted through the through path therein, and allows the signal lights having the wavelengths $\lambda_{AC}$, $\lambda_{BC}$, $\lambda_{CB}$ to be transmitted through the cross path therein. The WDM coupler 43 allows the signal lights having the wavelengths $\lambda_{AB}$, $\lambda_{BA}$, $\lambda_{CA}$, $\lambda_{AC}$ to be transmitted through the through path therein, and allows the signal lights having the wavelengths $\lambda_{BC}$, $\lambda_{CB}$ to be transmitted through the cross path therein.

The signal light having the wavelength $\lambda_{AB}$ which is inputted from the cable end A is transmitted through the through paths in the respective WDM couplers 41, 42, and outputted to the cable end B. The signal light having the wavelength $\lambda_{AC}$ which is inputted from the cable end A is transmitted through the cross path in the WDM coupler 41 and through the through path in the WDM coupler 43, and outputted to the cable end C. The signal light having the wavelength $\lambda_{BC}$ which is inputted from the cable end B is transmitted through the cross path in the WDM coupler 42 and through the cross path in the WDM coupler 43, and outputted to the cable end C. The signal light having the wavelength $\lambda_{BA}$ which is inputted from the cable end B is transmitted through the through path in the WDM coupler 42 and through the through path in the WDM coupler 41, and outputted to the cable end A. The signal light having the wavelength $\lambda_{Cb}$ which is inputted from the cable end C is transmitted through the cross path in the WDM coupler 43 and through the cross path in the WDM coupler 42, and outputted to the cable end B. The signal light having the wavelength $\lambda_{CA}$ which is inputted from the cable end C is transmitted through the through path in the WDM coupler 43 and through the cross path in the WDM coupler 41, and outputted to the cable end A.

An optical communication network that incorporates the undersea branch device which has the WDM couplers 41, 42, 43 with the different wavelength vs. branching ratio characteristics may have transmission cables each comprising a single optical fiber. As a result, the number of optical fibers used is relatively small. The undersea branch device shown in FIG. 8 is relatively simple in structure as it does not employ optical circulators.

According to certain arrangements of the present invention, the branch device has three wavelength dividing and multiplexing means which allow the branch device and each station to be connected by a transmission cable comprising a single pair of optical fibers for transmitting signal light between the stations. According to other arrangements of the present invention, the wavelength dividing and multiplexing means have different characteristics or the branch device additionally has optical circulators for connecting the branch device and each station through single-fiber transmission cables. A repeater on each of the transmission cables may be of a single-system configuration for upstream and downstream signal transmission. As a result, the installation cost of an entire optical communication network may be reduced by the branch device according to the present invention.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A branch device for use in an optical multiplex system, connected to first, second, and third transmission paths extending to respective stations in an optical communication network, for branching signal lights transmitted between the stations, comprising:

first wavelength dividing and multiplexing means for outputting a signal light in a first band inputted to a first input port thereof to a first output port thereof, outputting a signal light in a second band inputted to the first input port thereof to a second output port thereof, and outputting a signal light in the second band inputted to a second input port thereof to the first output port thereof, said first input port being connected to an input optical fiber connected to the first transmission path, said first output port being connected to an output optical fiber connected to the second transmission path;

second wavelength dividing and multiplexing means for outputting a signal light in the first band inputted to a first input port thereof to a first output port thereof, outputting a signal light in the second band inputted to the first input port thereof to a second output port thereof, and outputting a signal light in the second band inputted to a second input port thereof to the first output port thereof, said first input port of said second wavelength dividing and multiplexing means being connected to an input optical fiber connected to the second transmission path, said second input port of said second wavelength dividing and multiplexing means being connected to the second output port of said first wavelength dividing and multiplexing means, said first output port of said second wavelength dividing and multiplexing means being connected to an output optical fiber connected to the third transmission path; and third wavelength dividing and multiplexing means for outputting a signal light in the first band inputted to a first input port thereof to a first output port thereof, outputting a signal light in the second band inputted to the first input port thereof to a second output port thereof, and outputting a signal light in the second band inputted to a second input port thereof to the first output port thereof, said first input port of said third wavelength dividing and multiplexing means being connected to an input optical fiber connected to the third transmission path, said second input port of said third wavelength dividing and multiplexing means being connected to the second output port of said second wavelength dividing and multiplexing means, said first output port of said third wavelength dividing and multiplexing means being connected to an output optical fiber connected to the first transmission path, said second output port of said third wavelength dividing and multiplexing means being connected to the second input port of said first wavelength dividing and multiplexing means.

2. A branch device according to claim 1, further comprising:

light amplifiers connected between the transmission paths and the first, second, and third wavelength dividing and multiplexing means, for amplifying the signal lights transmitted from the transmission paths to the first, second, and third wavelength dividing and multiplexing means.

3. A branch device according to claim 1, further comprising:

light amplifiers connected between the input optical fibers connected to the transmission paths and the first, second, and third wavelength dividing and multiplexing means, for amplifying the signal lights transmitted from the input optical fibers to the first, second, and third wavelength dividing and multiplexing means; and optical pulse testing couplers for transmitting optical pulses which are reflected from defects in the transmission paths back to said light amplifiers to the output optical fibers connected to the transmission paths.

4. A branch device according to claim 1, wherein each of the transmission paths comprises a single optical fiber for bidirectional transmission, further comprising optical circulators having respective first ports connected to the transmission paths, respectively, second ports connected to the respective first input ports of the first, second, and wavelength dividing and multiplexing means, and respective third ports connected to the respective first output ports of the first, second, and wavelength dividing and multiplexing means, said optical circulators being arranged to output signal lights inputted to the first ports thereof to the second ports thereof and to output signal lights inputted to the third ports thereof to the first ports thereof.

5. A branch device for use in an optical multiplex system, connected to first, second, and third transmission paths each comprising a single optical fiber for bidirectional transmission to respective stations in an optical communication network, for branching signal lights transmitted between the stations, comprising:

first wavelength dividing and multiplexing means for bidirectionally transmitting a signal light in a wavelength band shorter than a first boundary wavelength between a first port thereof and a second port thereof, and bidirectionally transmitting a signal light in a wavelength band longer than said first boundary wavelength between said first port thereof and a third port thereof, said first port being connected to the first transmission path;

second wavelength dividing and multiplexing means for bidirectionally transmitting a signal light in a wavelength band shorter than a second boundary wavelength which is larger than said first boundary wavelength between a first port thereof and a second port thereof, and bidirectionally transmitting a signal light in a wavelength band longer than said second boundary wavelength between said first port thereof and a third port thereof, said first port of said second wavelength dividing and multiplexing means being connected to the second transmission path, said second port of said second wavelength dividing and multiplexing means being connected to said second port of said first wavelength dividing and multiplexing means; and third wavelength dividing and multiplexing means for bidirectionally transmitting a signal light in a wavelength band shorter than a third boundary wavelength which is larger than said second boundary wavelength between a first port thereof and a second port thereof, and bidirectionally transmitting a signal light in a wavelength band longer than said third boundary wavelength between said first port thereof and a third port thereof, said first port of said third wavelength dividing and multiplexing means being connected to the third transmission path, said second port of said third wavelength dividing and multiplexing means being connected to said third port of said first wavelength dividing and multiplexing means, said third port of said third wavelength dividing and multiplexing means being connected to said third port of said second wavelength dividing and multiplexing means.

* * * * *